(12) United States Patent
Takeda

(10) Patent No.: US 8,587,715 B2
(45) Date of Patent: Nov. 19, 2013

(54) SOUND PICKUP DEVICE

(75) Inventor: Masami Takeda, Takasaki (JP)

(73) Assignee: JVC KENWOOD Corporation, Kanagawa (JP)

(*) Notice: Subject to any disclaimer, the term of this patent is extended or adjusted under 35 U.S.C. 154(b) by 191 days.

(21) Appl. No.: 13/343,028

(22) Filed: Jan. 4, 2012

(65) Prior Publication Data

US 2012/0176535 A1 Jul. 12, 2012

(30) Foreign Application Priority Data

Jan. 7, 2011 (JP) ................................ 2011-002548

(51) Int. Cl.
*H04N 5/225* (2006.01)
*H04N 5/232* (2006.01)

(52) U.S. Cl.
USPC ............. 348/373; 348/231.4; 348/423.1; 396/347; 396/105; 381/91; 381/355

(58) Field of Classification Search
USPC ............. 348/231.4, 333.01, 373–375, 423.1, 348/462, 480, 483, 736, E5.125
See application file for complete search history.

(56) References Cited

U.S. PATENT DOCUMENTS

| 4,314,098 | A | * | 2/1982 | Maerfeld | 381/92 |
| 6,078,758 | A | * | 6/2000 | Patton et al. | 396/312 |
| 7,864,243 | B2 | * | 1/2011 | Tsutsumi | 348/373 |
| 8,351,633 | B2 | * | 1/2013 | Lassally | 381/359 |
| 2008/0019551 | A1 | * | 1/2008 | Watanabe | 381/360 |
| 2013/0039523 | A1 | * | 2/2013 | Van Dijk | 381/356 |

FOREIGN PATENT DOCUMENTS

| JP | 10-506512 | 6/1998 |
| WO | 96/10884 | 4/1996 |

* cited by examiner

*Primary Examiner* — Hung Lam
(74) *Attorney, Agent, or Firm* — Louis Woo

(57) ABSTRACT

A sound pickup device is designed for an imaging apparatus including an objective lens and a camera casing. The sound pickup device includes first and second microphone holders fixed to the camera casing and each having an inner wall surface neighboring and facing a surface of the camera casing. First and second microphone units are held by the first and second microphone holders, respectively. The first and second microphone holders are located at left and right sides of the camera casing respectively while being separated from each other in a direction perpendicular to an optical axis of the objective lens. The aforesaid surface of the camera casing forms a sound reflecting surface which reflects incoming sound. Each of the first and second microphone units has a sound pickup surface facing the sound reflecting surface to pick up the sound reflected by the sound reflecting surface.

6 Claims, 6 Drawing Sheets

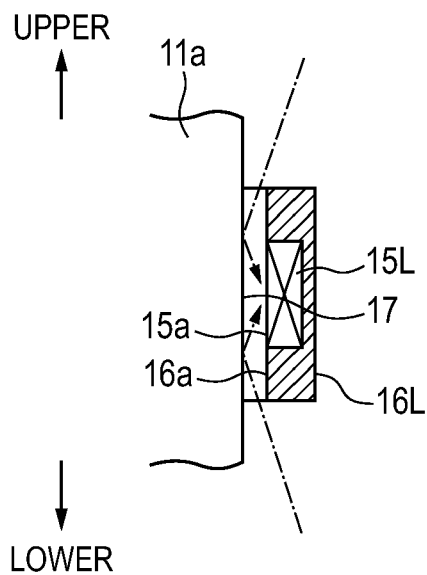
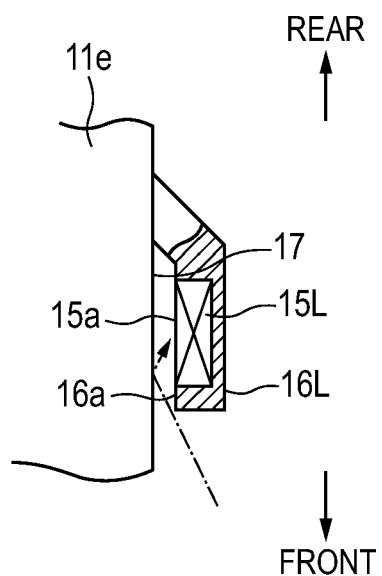
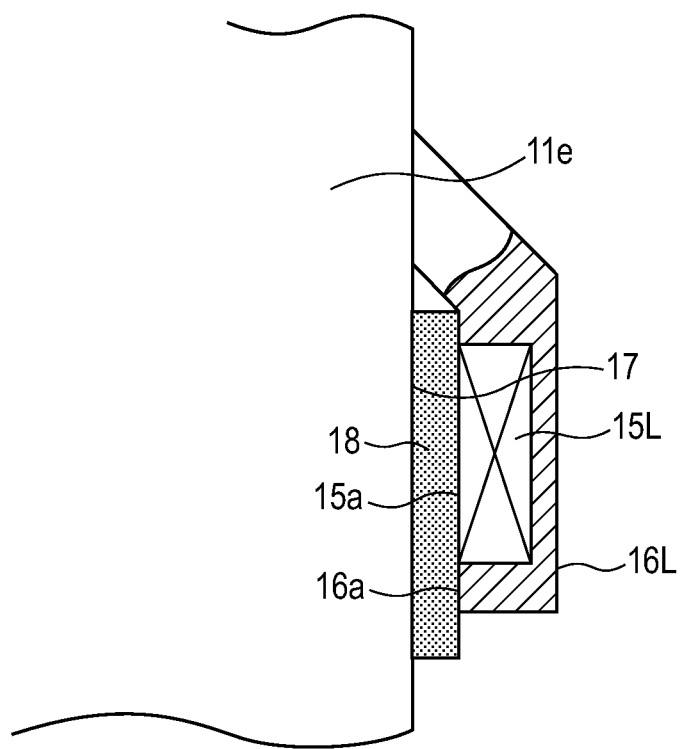

SOUND PICKUP DEVICE

CROSS-REFERENCE TO RELATED APPLICATIONS

This application claims priority from Japanese patent application number 2011-002548, filed on Jan. 7, 2011, the disclosure of which is hereby incorporated by reference.

BACKGROUND OF THE INVENTION

1. Field of the Invention

This invention generally relates to a sound pickup device that can be used for an imaging apparatus such as a video camera. This invention particularly relates to a device capable of implementing good stereophonic sound pickup while adequately suppressing interference between direct sound from a sound source and reflected sound therefrom via walls and a floor during, for example, indoor use. Furthermore, this invention relates to an imaging apparatus equipped with a sound pickup device.

2. Description of the Related Art

A typical imaging apparatus such as a video camera for capturing moving images is equipped with a sound pickup device to obtain sound information. A general example of such a sound pickup device has two unidirectional microphone units contained in a camera casing. Another general example is designed so that a stereophonic microphone assembly having a single body containing two unidirectional microphone units is accommodated in a camera casing. In these examples, the two microphone units are relatively close to each other, and hence there is only a small difference between sound reaching one of the microphones from a sound source and sound reaching the other microphone from the sound source. Accordingly, the sound pickup performance of these examples tends to be not so different from that of a sound pickup device having only a single microphone unit. Thus, it tends to be difficult to implement good stereophonic sound pickup.

PCT publication number WO 96/10884 corresponding to Japanese patent application publication number Hei-10-506512 discloses a sound pickup device designed so that ear-like projections having central holes are provided on right and left sides of a camera body respectively, and a microphone unit is located at a deep position within the central hole in each of the ear-like projections.

In the sound pickup device of PCT number WO 96/10884, the two microphone units are well separated, and the camera body functions as a dummy head. Thus, it is possible to obtain stereophonic sound pickup performance and binaural sound pickup performance better than those of a sound pickup device having two microphone units close to each other and located in a camera casing.

In the sound pickup device of PCT number WO 96/10884, the ear-like projections are main portions of sound pickup elements, and there are strict limitations on the shape of the camera body and the positions of the microphone units. If the elements and members are placed differently from a specified configuration, desired stereophonic sound pickup and recording are difficult to implement. Thus, it is hard to achieve good tone quality during playback of recorded sounds.

SUMMARY OF THE INVENTION

It is an object of this invention to provide a sound pickup device for a camera which can implement good stereophonic sound pickup with good tone quality.

It is another object of this invention to provide an imaging apparatus equipped with an improved sound pickup device.

A first aspect of this invention provides a sound pickup device for an imaging apparatus including an objective lens and a camera casing having a front provided with the objective lens. The sound pickup device comprises first and second microphone holders fixed to the camera casing and each having an inner wall surface neighboring and facing a surface of the camera casing; and first and second microphone units held by the first and second microphone holders respectively. The first and second microphone holders are located at left and right sides of the camera casing respectively while being separated from each other in a direction perpendicular to an optical axis of the objective lens. The surface of the camera casing forms a sound reflecting surface which reflects incoming sound from a sound source, and which neighbors and faces the inner wall surface of each of the first and second microphone holders. Each of the first and second microphone units has a sound pickup surface facing the sound reflecting surface to pick up the sound reflected by the sound reflecting surface.

A second aspect of this invention is based on the first aspect thereof, and provides a sound pickup device wherein the first and second microphone holders are provided on left and right side surfaces of the camera casing respectively, and the first and second microphone holders have rear ends which are remote from the front of the camera casing and which are continuous with the left and right side surfaces of the camera casing respectively.

A third aspect of this invention is based on the second aspect thereof, and provides a sound pickup device wherein a display panel is movably provided on one of the left and right side surfaces of the camera casing at a place in the rear of the first microphone holder, and a cover panel is provided on the other of the left and right side surfaces of the camera casing at a place in the rear of the second microphone holder and is movable into and from an unfolded position, and wherein the cover panel in its unfolded position is located between user's hand holding the camera casing and the second microphone unit to prevent user's hand from accidentally touching the second microphone unit.

A fourth aspect of this invention is based on the first aspect thereof, and provides a sound pickup device further comprising a flexible porous member placed between the sound reflecting surface and each of the first and second microphone holders to prevent wind noise from occurring.

A fifth aspect of this invention is based on the first aspect thereof, and provides a sound pickup device wherein the sound reflecting surface extends at a bottom of a recess in an outer surface of the camera casing.

A sixth aspect of this invention provides an imaging apparatus comprising an objective lens; a camera casing having a front provided with the objective lens; and a sound pickup device. The sound pickup device comprises first and second microphone holders fixed to the camera casing and each having an inner wall surface neighboring and facing a surface of the camera casing, and first and second microphone units held by the first and second microphone holders respectively. The first and second microphone holders are located at left and right sides of the camera casing respectively while being separated from each other in a direction perpendicular to an optical axis of the objective lens. The surface of the camera casing forms a sound reflecting surface which reflects incoming sound from a sound source, and which neighbors and faces the inner wall surface of each of the first and second microphone holders. Each of the first and second microphone units has a sound pickup surface facing the sound reflecting surface to pick up the sound reflected by the sound reflecting surface.

This invention provides the following advantage. The sound pickup device of this invention can implement good stereophonic sound pickup with good tone quality.

BRIEF DESCRIPTION OF THE DRAWINGS

FIG. 4(A) is a partial section view of a portion of the imaging apparatus in FIG. 1.

FIG. 4(B) is a partial section view of a portion of the imaging apparatus in FIG. 1.

FIG. 5 is a partial section view of a portion of a modification of the imaging apparatus in FIG. 1.

DETAILED DESCRIPTION OF THE INVENTION

In the following description, "upper", "lower", "left", and "right" with respect to an imaging apparatus mean those occurring when the position of the imaging apparatus is such that the optical axes of objective lenses therein are parallel to the horizontal plane and two microphone units therein are equal in height (vertical position).

Embodiments of this invention will be explained below while an imaging apparatus having two objective lenses will be taken as an example. The imaging apparatus may have only one objective lens. The imaging apparatus may have three or more objective lenses.

First Embodiment

Figure 1:
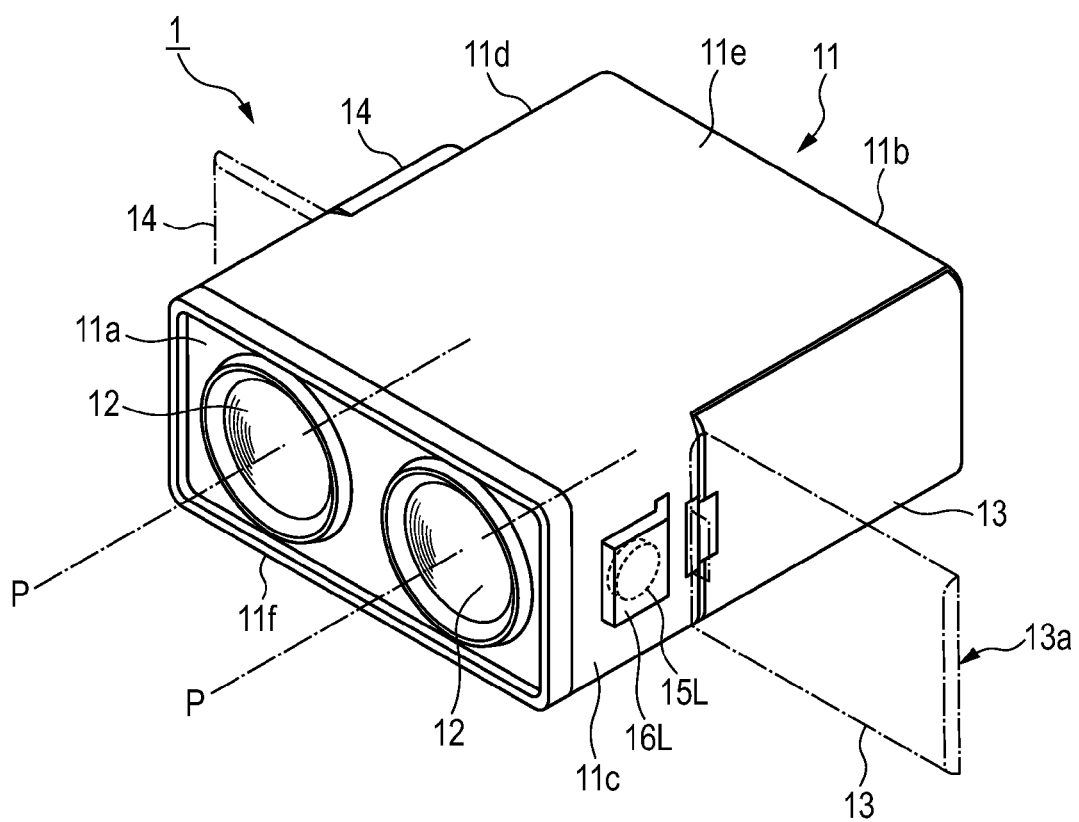
FIG. 1 is a perspective view of an imaging apparatus equipped with a sound pickup device according to a first embodiment of this invention.
Figure 2:
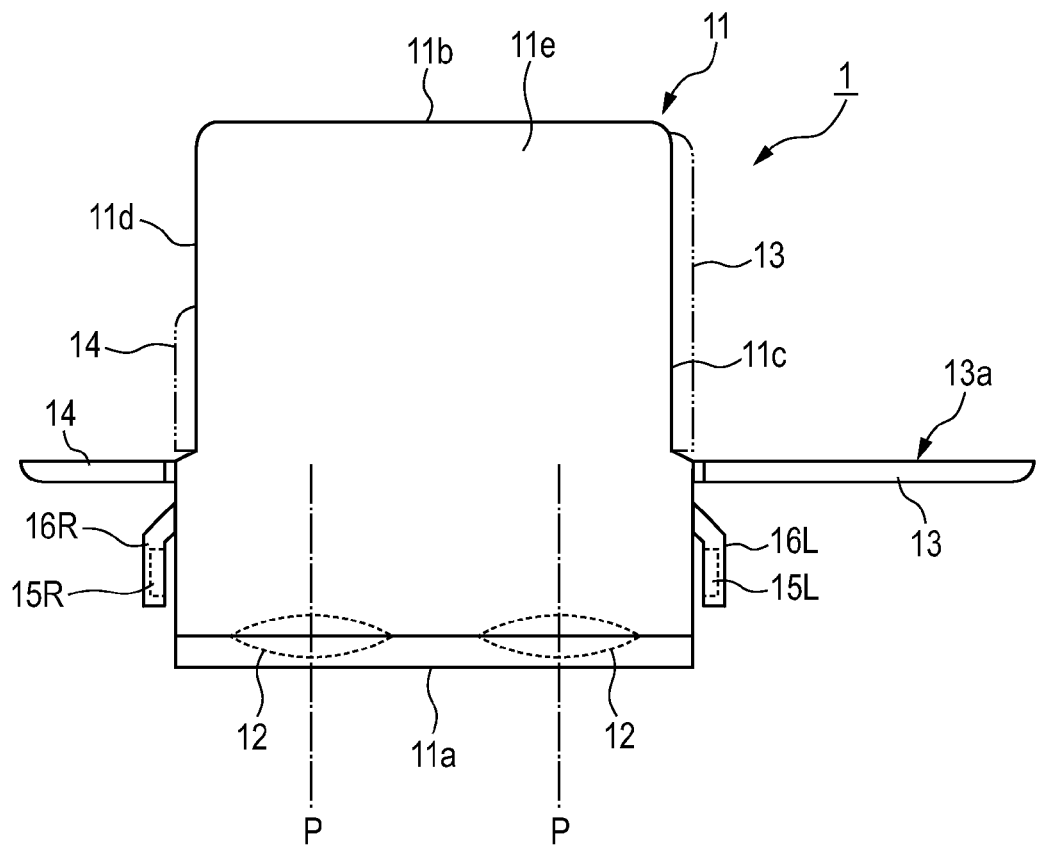
FIG. 2 is a top view of the imaging apparatus in FIG. 1.
Figure 3:
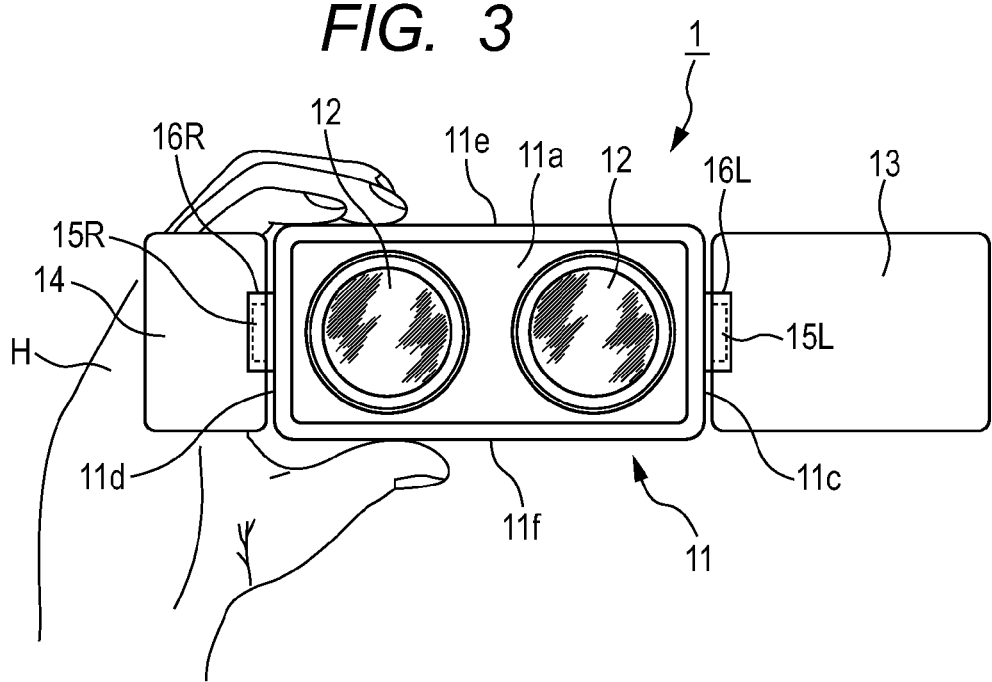
FIG. 3 is a front view of the imaging apparatus in FIG. 1.

FIGS. 1-3 show an imaging apparatus 1 equipped with a sound pickup device according to a first embodiment of this invention. The imaging apparatus 1 is a video camera (camcorder) including a combination of an image capturing section and a sound recording section.

As shown in FIGS. 1-3, the imaging apparatus 1 has a camera casing or body 11 on which objective lenses 12 are provided. The objective lenses 12 may be removably attached to the camera casing 11. The objective lenses 12 focus light indicative of images of a scene or a subject onto a photoelectric conversion surface within the camera casing 11 so that the images are converted into corresponding electric signals via the photoelectric conversion surface. Thus, the images are captured or taken.

The camera casing 11 includes a hollow structure or frame having a front 11a, a rear 11b, a left side 11c, a right side 11d, a top 11e, and a bottom 11f. The objective lenses 12 are supported on the front 11a. The rear 11b is opposite to the front 11a. The left and right sides 11c and 11d extend in parallel with the optical axes P of the objective lenses 12, and are spaced from each other in a widthwise direction of the camera casing 11.

A rectangular display panel 13 is provided on the left side 11c of the camera casing 11. The display panel 13 may be provided on the right side 11d of the camera casing 11. The display panel 13 operates to indicate a subject image or images taken via the objective lenses 12 and the photoelectric conversion surface.

The display panel 13 is hinged to the left side 11c of the camera casing 11 so as to be rotatable or swingable about its vertical edge relative to the left side 11c. The display panel 13 can swing between a folded position (a retracted position) and an unfolded position (a projecting position). The display panel 13 extends adjacently along the left side 11c when being in its folded position. The display panel 13 extends perpendicular to the left side 11c when being in its unfolded position. A major surface of the display panel 13, which faces rearward when the display panel 13 is in its unfolded position, has a display surface 13a formed by, for example, a liquid crystal display surface.

A rectangular cover panel 14 is provided on the right side 11d of the camera casing 11. The cover panel 14 may be provided on the left side 11c of the camera casing 11. The cover panel 14 is hinged to the right side 11d so as to be rotatable or swingable about its vertical edge relative to the right side 11d. The cover panel 14 can swing between a folded position (a retracted position) and an unfolded position (a projecting position). The cover panel 14 extends adjacently along the right side 11d when being in its folded position. The cover panel 14 extends perpendicular to the right side 11d when being in its unfolded position.

A microphone holder 16L retaining a microphone unit 15L is fixedly provided on the left side 11c of the camera casing 11 at a position in front of the display panel 13. A microphone holder 16R retaining a microphone unit 15R is fixedly provided on the right side 11d of the camera casing 11 at a position in front of the cover panel 14. Thus, the display panel 13 extends rearward of the microphone holder 16L. The cover panel 14 extends rearward of the microphone holder 16R. The microphone holders 16L and 16R are separated from each other in a direction perpendicular to the optical axes P of the objective lenses 12. Similarly, the microphone units 15L and 15R are separated from each other in a direction perpendicular to the optical axes P of the objective lenses 12. The microphone units 15L and 15R are left and right microphone units in a pair, respectively. In the case where a user operates the imaging apparatus 1 to implement image capture and sound pickup while placing the display panel 13 and the cover panel 14 in their unfolded positions, the display panel 13 and the cover panel 14 form protective walls for preventing user's hands from accidentally touching the microphone holders 16L and 16R. Thus, it is possible to prevent the occurrence of noise sound that would be caused by the contact of user's hands with the microphone holders 16L and 16R.

In particular, when the user holds the imaging apparatus 1 by user's hand H and operates the imaging apparatus 1 while placing the display panel 13 and the cover panel 14 in their unfolded positions as shown in FIG. 3, the cover panel 14 is located between user's hand H and the microphone holder 16R and forms the foregoing protective wall. Furthermore, the cover panel 14 has sound reflecting effects on the microphone unit 15R that are equal or similar to the sound reflecting effects of the display panel 13 on the microphone unit 15L.

Specifically, in the case where the imaging apparatus 1 is operated to implement image capture and sound pickup while the display panel 13 and the cover panel 14 are in their unfolded positions, sound wave from a sound source in a subject is reflected by the display panel 13 and the cover panel 14 and portions of the reflected sound wave reach the microphone units 15L and 15R which are in front of the display panel 13 and the cover panel 14 respectively. The positional relation of the cover panel 14 with the microphone unit 15R is similar to that of the display panel 13 with the microphone unit 15L. Therefore, the display panel 13 has sound reflecting effects on the microphone unit 15L while the cover panel 14 has similar sound reflecting effects on the microphone unit 15R. Accordingly, it is possible to prevent the occurrence of an unbalance between the sound reflecting effects of the display panel 13 on the microphone unit 15L and those of the cover panel 14 on the microphone unit 15R.

The microphone units 15L and 15R are symmetrical between left and right, and have the same structure. The microphone holders 16L and 16R are symmetrical between left and right, and have the same structure also. Each of the microphone holders 16L and 16R is made of, for example, synthetic resin, and has a plate-like structure.

With reference to FIGS. 4(A), 4(B), and 5, each of the microphone units 16L and 16R has an inner wall surface 16a opposing (facing) and neighboring a surface 17 of the camera casing 11. There is a given spacing or gap between the inner wall surface 16a and the camera casing surface 17. The camera casing 11 includes a coating and seals if they are provided on the camera casing surface.

Each of the microphone units 15L and 15R is fixed to and retained by the associated microphone holder 16L or 16R while being embedded in the microphone holder walls at the inner wall surface 16a thereof. Each of the microphone units 15L and 15R is, for example, a non-directional ECM (electret-condenser microphone). Each of the microphone units 15L and 15R has a sound pickup surface 15a exposed at the inner wall surface 16a of the associated microphone holder 16L or 16R and facing the surface 17 of the camera casing 11. Preferably, the sound pickup surface 15a of each of the microphone units 15L and 15R is flush with the inner wall surface 16a of the associated microphone holder 16L or 16R. The microphone holders 16L and 16R may be integral with the camera casing 11. Preferably, each of the microphone holders 16L and 16R is formed as a member separated from the camera casing 11 to enable the associated microphone unit 15L or 15R to be easily provided at the inner wall surface 16a thereof. During assembly, after the microphone units 15L and 15R are attached to the microphone holders 16L and 16R respectively, the microphone holders 16L and 16R are fixed to the camera casing 11.

As previously mentioned, the microphone holders 16L and 16R may be integral with the camera casing 11. In this case, through holes are provided in the microphone holders 16L and 16R, and the microphone units 15L and 15R are pressed and inserted into the through holes until reaching desired positions respectively. Thus, the microphone units 15L and 15R can easily be attached to the microphone holders 16L and 16R respectively.

The areas in the surface of the camera casing 11 which are covered by the microphone holders 16L and 16R form sound reflecting surfaces 17 which reflect incoming sound waves toward the microphone units 15L and 15R respectively. The reflected sound waves are picked up by the microphone units 15L and 15R which oppose the sound reflecting surfaces 17 respectively.

The microphone holder 16L is continuous or connected with the left side 11c of the camera casing 11 at the rear end of itself only. Similarly, the microphone holder 16R is continuous or connected with the right side 11d of the camera casing 11 at the rear end of itself only. Regarding each of the microphone holders 16L and 16R, as denoted by the arrows in FIGS. 4(A) and 4(B), portions of sound waves from a sound source in a subject directly enter the spacing between the camera casing surface 17 and the inner wall surface 16a of the microphone holder 16L or 16R via front, upper, and lower openings of the spacing before being reflected by the camera casing surface 17 and reaching the sound pickup surface 15a of the microphone unit 15L or 15R. Thus, the camera casing surface 17 serves as a sound reflecting surface. Regarding each of the microphone holders 16L and 16R, the spacing between the camera casing surface 17 and the inner wall surface 16a of the microphone holder 16L or 16R has none of rear and side openings. Therefore, each of the microphone holders 16L and 16R blocks noise sounds coming from the rear and sides thereof.

During indoor use of the imaging apparatus 1, small portions of sound from a sound source reach the microphone units 15L and 15R after being reflected by walls and a floor. Each of the microphone units 15L and 15R is of a boundary-type configuration such that the microphone unit is held while its sound pickup surface 15a faces the sound reflecting surface 17. Thus, regarding the microphone units 15L and 15R, it is possible to adequately suppress interference between direct sound from the sound source and reflected sound therefrom via walls and a floor. Furthermore, it is possible to prevent the occurrence of great peaks and dips in the frequency responses of the microphone units 15L and 15R.

Accordingly, the imaging apparatus 1 can implement noise-free and high-quality stereophonic sound pickup. Preferably, the camera casing 11 has a width chosen to enable the microphone units 15L and 15R to be adequately separated from each other for stereophonic sound pickup. More preferably, the width of the camera casing 11 is chosen to correspond to the average width of human heads. The width of the camera casing 11 is equal to, for example, from about 17 cm to about 18 cm. Thus, the camera casing 11 with the microphone units 15L and 15R functions as a dummy head for binaural sound pickup and recording. Recorded binaural signals occur as a result of the binaural sound pickup and recording. When sounds are reproduced from the recorded binaural signals by a stereophonic headphone, a listener can feel good sound image localization. By signal processing for canceling crosstalk and equalizing transfer characteristics, stereophonic sound reproduction from the recorded binaural signals with good sound image localization can be implemented by loudspeakers. Furthermore, when transaural processing is implemented, surround playback is available concerning sound reproduction from the recorded binaural signals.

Regarding each of the microphone units 15L and 15R, as the distance between the sound reflecting surface 17 and the sound pickup surface 15a of the microphone unit (or the inner wall surface 16a of the microphone holder) decreases, the resonance frequency of the microphone unit increases. Preferably, the distance between the sound reflecting surface 17 and the sound pickup surface 15a of the microphone unit (or the inner wall surface 16a of the microphone holder) is chosen so that the resonance frequency of the microphone unit will be 20 kHz or higher. The distance is, for example, from 1 mm to 1.5 mm. In this case, the frequency response of each of the microphone units 15L and 15R has a peak at a frequency of 20 kHz or higher. Such a high frequency is in a human inaudible range, and a process of removing related high-frequency signal components is unnecessary so that a signal processing circuit for sound recording and reproduction can be simple.

With reference to FIG. 5, regarding each of the microphone holders 16L and 16R, it is preferable to place and fit a flexible porous member 18 into the spacing between the camera casing surface 17 and the inner wall surface 16a of the microphone holder. The flexible porous member 18 is made of, for example, glass wool or polyurethane. The flexible porous member 18 prevents the occurrence of wind noise which might be picked up by the microphone unit.

Second Embodiment

Figure 6:
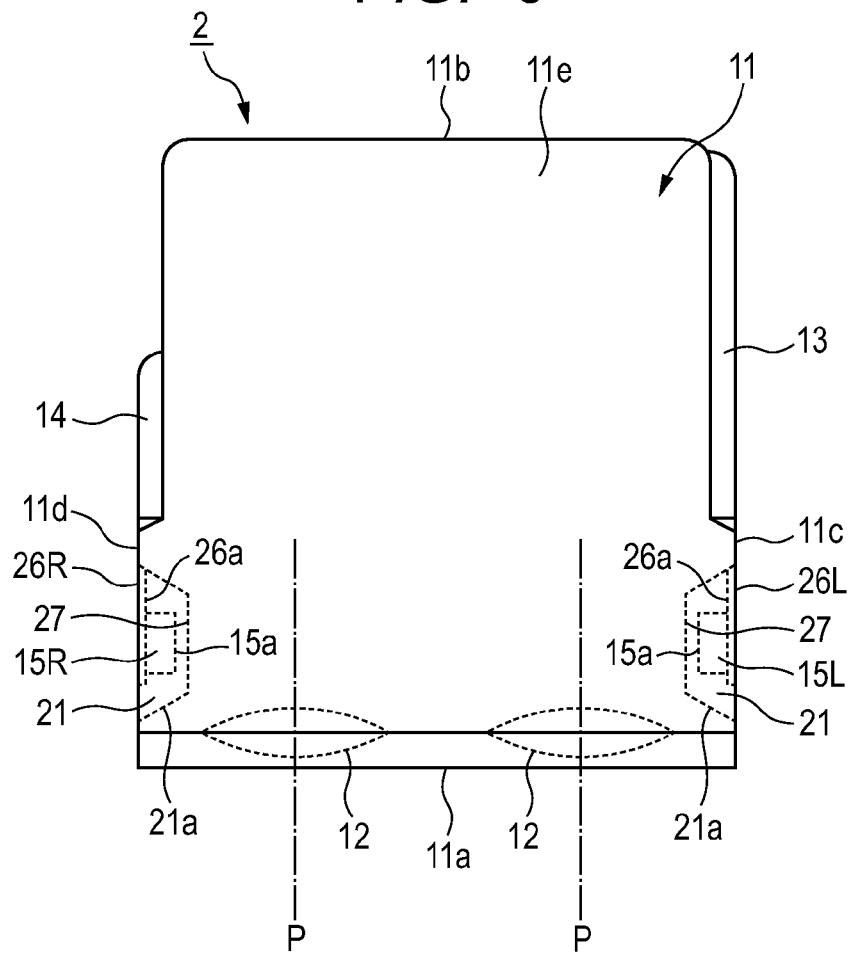
FIG. 6 is a top view of an imaging apparatus equipped with a sound pickup device according to a second embodiment of this invention.
Figure 7:
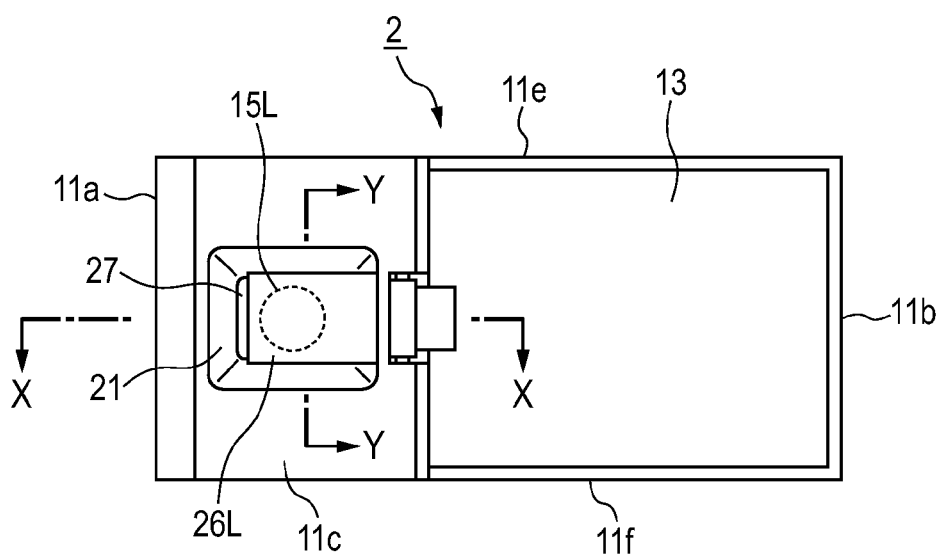
FIG. 7 is a side view of the imaging apparatus in FIG. 6.

FIGS. 6 and 7 show an imaging apparatus 2 equipped with a sound pickup device according to a second embodiment of this invention. The imaging apparatus 2 is similar to the imaging apparatus 1 except for design changes mentioned hereafter. Elements in FIGS. 6 and 7 which are substantially the same as those in FIGS. 1-3 are denoted by the same reference characters.

As shown in FIGS. 6 and 7, the left and right sides 11c and 11d of the camera casing 11 have recesses 21 at positions in front of the display panel 13 and the cover panel 14, respectively. The bottoms of the recesses 21 form sound reflecting surfaces 27 opposing and neighboring inner wall surfaces 26a of microphone holders 26L and 26R, respectively. There are given spacings or gaps between the sound reflecting surfaces 27 and the inner wall surfaces 26a. The microphone holders 26L and 26R extend substantially in the recesses 21, respectively. Microphone units 15L and 15R located in the recesses 21 are provided on the inner wall surfaces 26a of the microphone holders 26L and 26R, respectively. The microphone units 15L and 15R have sound pickup surfaces 15a facing and neighboring the sound reflecting surfaces 27, respectively. There are given spacings or gaps between the sound reflecting surfaces 27 and the sound pickup surfaces 15a.

The microphone holders 26L and 26R are separated from each other in a direction perpendicular the optical axes P of the objective lenses 12. Similarly, the microphone units 15L and 15R are separated from each other in a direction perpendicular to the optical axes P of the objective lenses 12.

The recesses 21 in the left and right sides 11c and 11d of the camera casing 11 and the microphone holders 26L and 26R form structures similar to human external ears. Accordingly, there are enhanced binaural effects which allow the detection of the direction of a sound source through the use of the microphone units 15L and 15R. Thus, during the reproduction of sounds from binaural signals recorded by the imaging apparatus 2, a listener can feel better sound image localization.

Preferably, each of the microphone holders 26L and 26R is in the form of a flat plate. The microphone holders 26L and 26R have outer surfaces flush with or slightly indented relative to the outer surfaces of the left and right sides 11c and 11d of the camera casing 11 outside the recesses 21, respectively. The microphone holder 26L is continuous or connected with the left side 11c of the camera casing 11 at the rear end of itself only. Similarly, the microphone holder 26R is continuous or connected with the right side 11d of the camera casing 11 at the rear end of itself only.

Figure 8A:
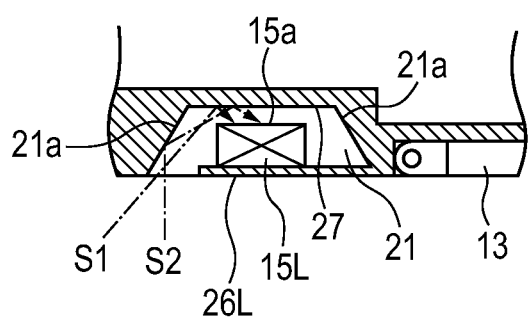
FIG. 8(A) is a sectional view taken along the line X-X in FIG. 7.
Figure 8B:
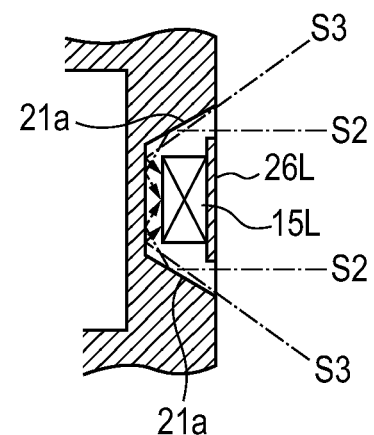
FIG. 8(B) is a sectional view taken along the line Y-Y in FIG. 7.

As shown in FIGS. 8(A) and 8(B), front ends and side edges of the microphone holders 26L and 26R face circumferential walls 21a defining the sides of the recesses 21.

In the imaging apparatus 2, the microphone holders 26L and 26R do not project from the left and right sides 11c and 11d of the camera casing 11. Thus, it is possible to reduce the risk of accidentally hitting the microphone holders 26L and 26R against an obstacle and thereby damaging them.

The edges of the microphone holders 26L and 26R are surrounded by the circumferential walls 21a defining the sides of the recesses 21. Thus, as denoted by the arrows in FIGS. 8(A) and 8(B), regarding each of the recesses 21, there occur differences among the timing at which a sound wave S1 is incident to the sound reflecting surface 27 from front, the timing at which sound waves S2 are incident to the sound reflecting surface 27 from side, and the timings at which sound waves S3 are incident to the sound reflecting surface 27 from above and below. The sound waves S1, S2, and S3 are generated by the same sound source before being reflected by the sound reflecting surface 27 and reaching the sound pickup surface 15a of the microphone unit 15L or 15R. The aforesaid timing differences enable the microphone units 15L and 15R to provide sound pickup effects causing good sound image localization in sound reproduction.

Regarding each of the sound holders 26L and 26R, to counter wind sound, it is preferable to place and fit a flexible porous member into the spacing between the sound reflecting surface 27 and the inner wall surface 26a of the sound holder as in the first embodiment of this invention.

Third Embodiment

Figure 9:
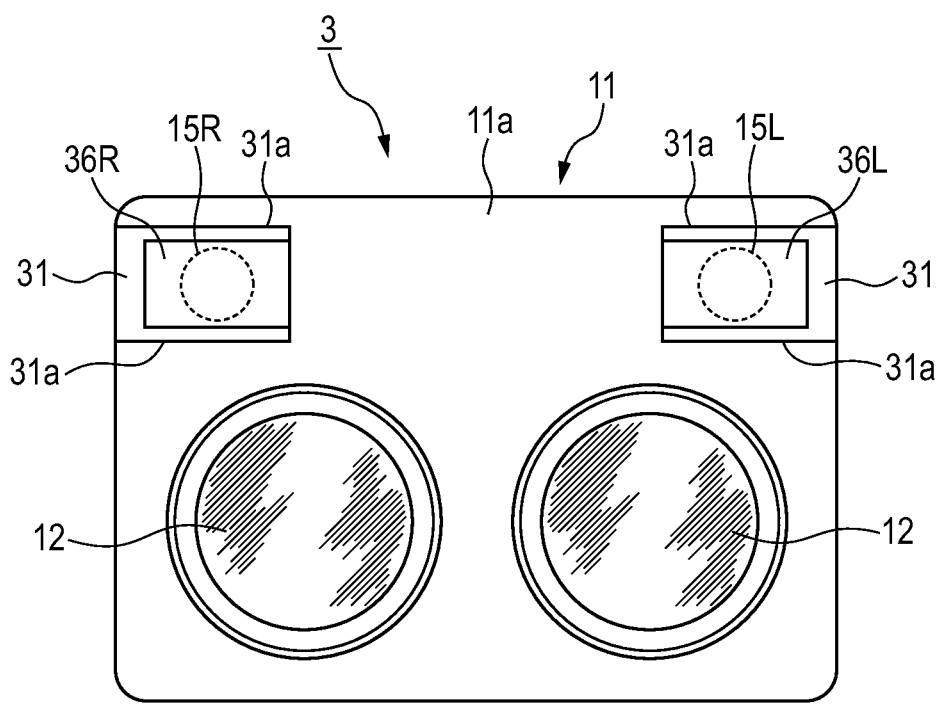
FIG. 9 is a front view of an imaging apparatus equipped with a sound pickup device according to a third embodiment of this invention.
Figure 10:
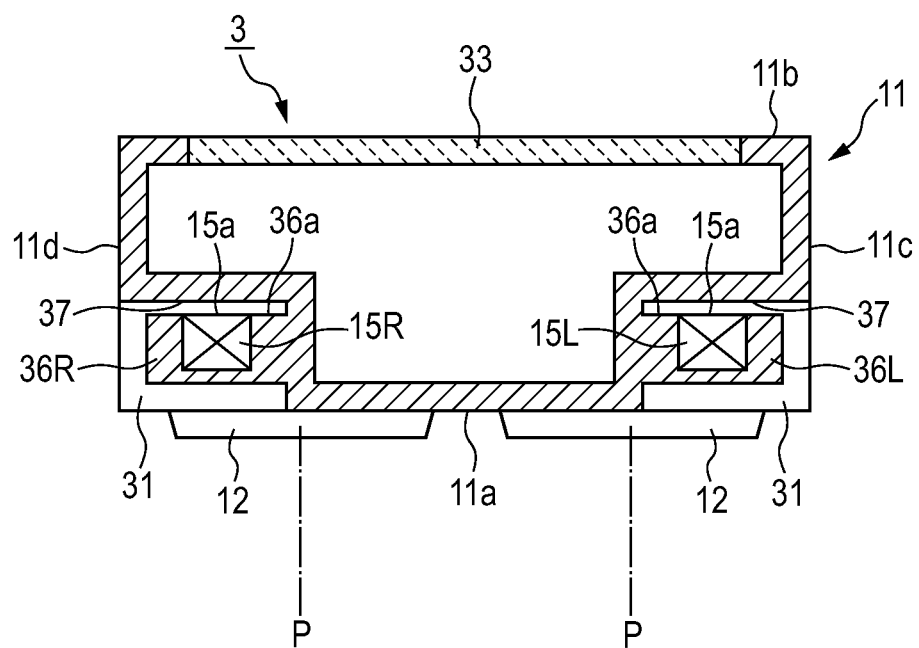
FIG. 10 is a transverse section view of the imaging apparatus in FIG. 9.

FIGS. 9 and 10 show an imaging apparatus 3 equipped with a sound pickup device according to a third embodiment of this invention. The imaging apparatus 3 is similar to the imaging apparatus 1 except for design changes mentioned hereafter. Elements in FIGS. 9 and 10 which are substantially the same as those in FIGS. 1-3 are denoted by the same reference characters.

As shown in FIGS. 9 and 10, the imaging apparatus 3 has microphone holders 36L and 36R provided on leftmost and rightmost portions of the front 11a of the camera casing 11 respectively. The front 11a of the camera casing 11 has two recesses 31 in which the microphone holders 36L and 36R are located respectively. Preferably, one of the recesses 31 extends at a corner between the front 11a and the left side 11c of the camera casing 11 while the other extends at a corner between the front 11a and the right side 11d thereof. The walls of the camera casing 11 which define the bottoms of the recesses 31 form sound reflecting surfaces 37.

Each of the microphone holders 36L and 36R has an inner wall surface 36a opposing and neighboring the associated sound reflecting surface 37. There is a given spacing or gap between the inner wall surface 36a and the sound reflecting surface 37. The microphone units 15L and 15R fit into grooves in the microphone holders 36L and 36R in a manner such that their sound pickup surfaces 15a are flush with the inner wall surfaces 36a of the microphone holders 36L and 36R. Incoming sounds reach the sound pickup surfaces 15a of the microphone units 15L and 15R after being incident to and reflected by the sound reflecting surfaces 37.

The microphone holders 36L and 36R are separated from each other in a direction perpendicular the optical axes of the objective lenses 12. Similarly, the microphone units 15L and 15R are separated from each other in a direction perpendicular to the optical axes of the objective lenses 12.

Preferably, each of the microphone holders 36L and 36R is in the form of a flat plate. The microphone holders 36L and 36R have outer surfaces flush with or slightly indented relative to the outer surfaces of the front 11a of the camera casing 11 outside the recesses 31, respectively. The microphone holders 36L and 36R are continuous or connected with the camera casing 11 at their proximal ends only. The microphone holders 36L and 36R have upper and lower edge surfaces facing surfaces 31a of the camera casing 11 which define the upper and lower sides of the recesses 31.

The display panel 13 and the cover panel 14 are absent from the imaging apparatus 3. Instead, a fixed-type display 33 is provided on the rear 11b of the camera casing 11.

The structures including the microphone holders 36L and 36R located in the recesses 31 prevent noise sounds from being incident to the sound reflecting surfaces 37 from back with respect to the camera casing 11. On the other hand, sounds from a sound source in front of the imaging apparatus 3 are positively incident to the sound reflecting surfaces 37. Furthermore, it is possible to adequately suppress interference between direct sound and reflected sound from the sound source. In addition, it is possible to prevent the occurrence of great peaks and dips in the frequency responses of the microphone units 15L and 15R.

Since the sound reflecting surfaces 37 are formed by the walls of the camera casing 11 which define the bottoms of the recesses 31, the microphone units 15L and 15R can provide sound pickup effects causing good sound image localization in sound reproduction.

The microphone holders 36L and 36R may be fixedly provided on the front 11a of the camera casing 11 in a manner such as to project therefrom as in the first embodiment of this invention. In this case, sound reflecting surfaces are formed by outer surfaces of the front 11a of the camera casing 11 which oppose and neighbor the inner wall surfaces 36a of the microphone holders 36L and 36R.

Regarding each of the sound holders 36L and 36R, to counter wind sound, it is preferable to place and fit a flexible porous member into the spacing between the sound reflecting surface 37 and the inner wall surface 36a of the sound holder as in the first embodiment of this invention.

What is claimed is:

1. A sound pickup device for an imaging apparatus including an objective lens and a camera casing having a front provided with the objective lens, the sound pickup device comprising:
   first and second microphone holders fixed to the camera casing and each having an inner wall surface neighboring and facing a surface of the camera casing; and
   first and second microphone units held by the first and second microphone holders respectively;
   wherein the first and second microphone holders are located at left and right sides of the camera casing respectively while being separated from each other in a direction perpendicular to an optical axis of the objective lens;
   wherein the surface of the camera casing forms a sound reflecting surface which reflects incoming sound from a sound source, and which neighbors and faces the inner wall surface of each of the first and second microphone holders; and
   wherein each of the first and second microphone units has a sound pickup surface facing the sound reflecting surface to pick up the sound reflected by the sound reflecting surface.

2. A sound pickup device as recited in claim 1, wherein the first and second microphone holders are provided on left and right side surfaces of the camera casing respectively, and the first and second microphone holders have rear ends which are remote from the front of the camera casing and which are continuous with the left and right side surfaces of the camera casing respectively.

3. A sound pickup device as recited in claim 2, wherein a display panel is movably provided on one of the left and right side surfaces of the camera casing at a place in the rear of the first microphone holder, and a cover panel is provided on the other of the left and right side surfaces of the camera casing at a place in the rear of the second microphone holder and is movable into and from an unfolded position, and wherein the cover panel in its unfolded position is located between user's hand holding the camera casing and the second microphone unit to prevent user's hand from accidentally touching the second microphone unit.

4. A sound pickup device as recited in claim 1, further comprising a flexible porous member placed between the sound reflecting surface and each of the first and second microphone holders to prevent wind noise from occurring.

5. A sound pickup device as recited in claim 1, wherein the sound reflecting surface extends at a bottom of a recess in an outer surface of the camera casing.

6. An imaging apparatus comprising:
   an objective lens;
   a camera casing having a front provided with the objective lens; and
   a sound pickup device;
   wherein the sound pickup device comprises first and second microphone holders fixed to the camera casing and each having an inner wall surface neighboring and facing a surface of the camera casing, and first and second microphone units held by the first and second microphone holders respectively;
   wherein the first and second microphone holders are located at left and right sides of the camera casing respectively while being separated from each other in a direction perpendicular to an optical axis of the objective lens;
   wherein the surface of the camera casing forms a sound reflecting surface which reflects incoming sound from a sound source, and which neighbors and faces the inner wall surface of each of the first and second microphone holders; and
   wherein each of the first and second microphone units has a sound pickup surface facing the sound reflecting surface to pick up the sound reflected by the sound reflecting surface.

* * * * *